Figure 3:
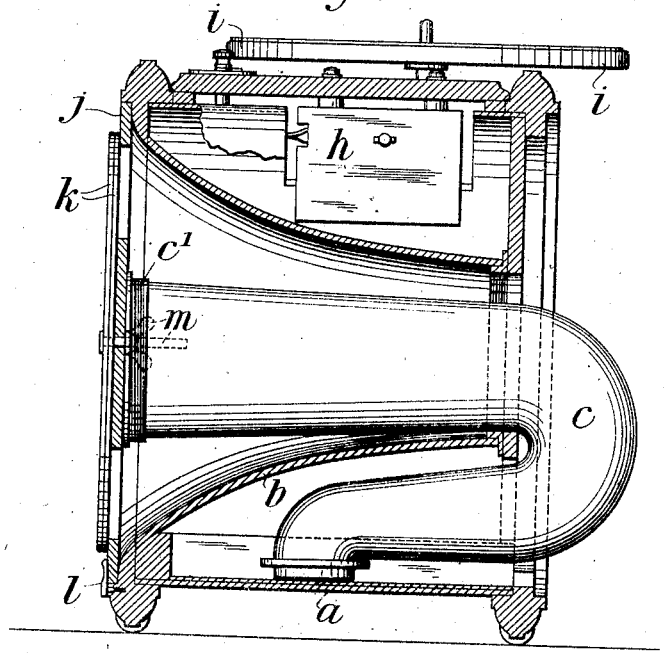

J. GREEN.
TALKING MACHINE.
APPLICATION FILED MAY 26, 1913.
1,094,067.
Patented Apr. 21, 1914.
2 SHEETS—SHEET 1.
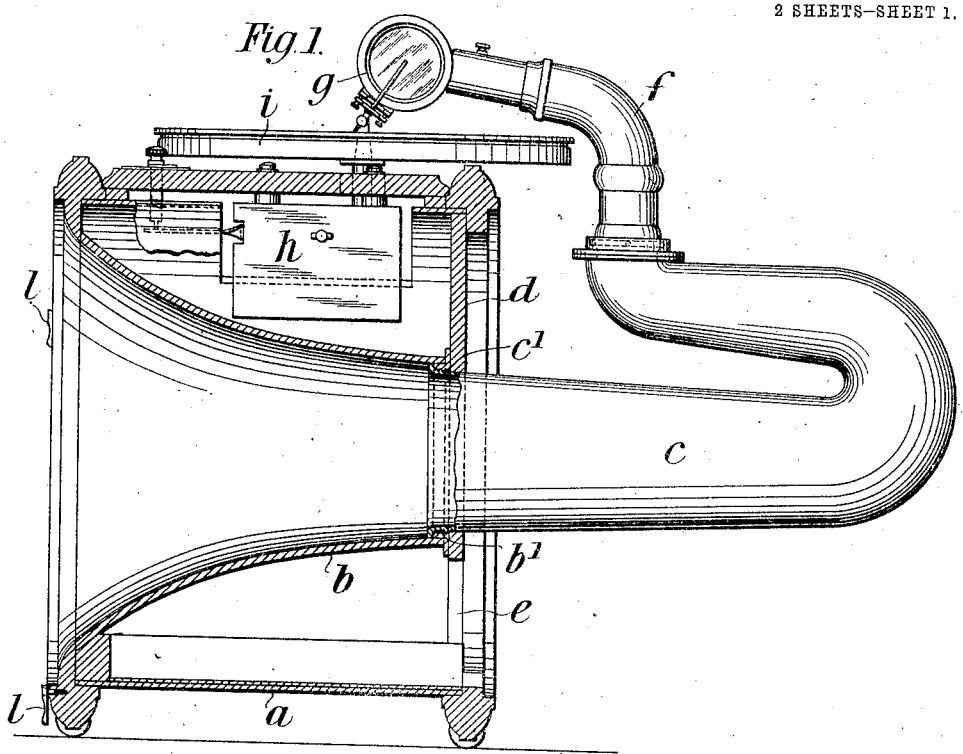
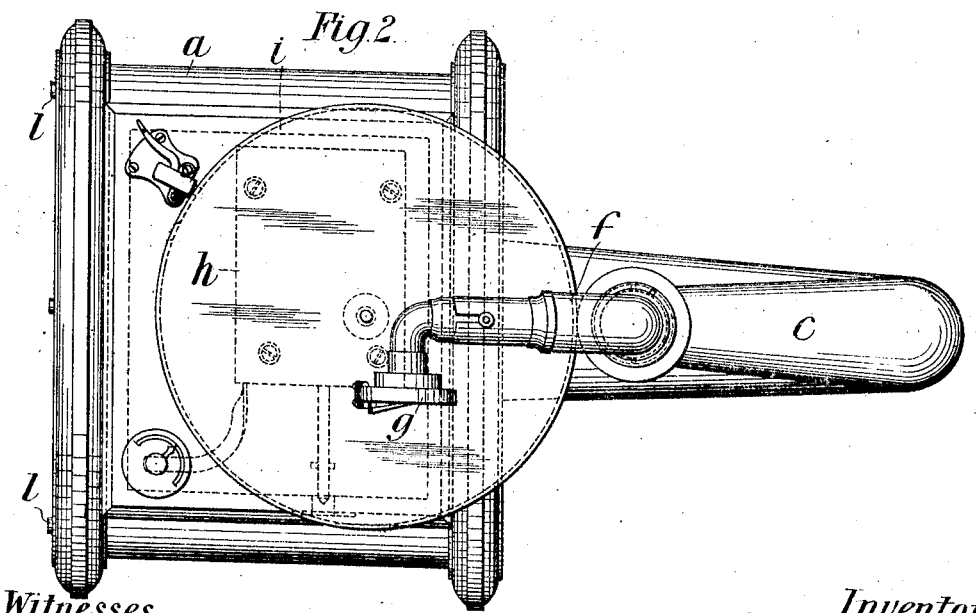
Witnesses
Inventor
Joshua Green

J. GREEN.
TALKING MACHINE.
APPLICATION FILED MAY 26, 1913.

1,094,067.

Patented Apr. 21, 1914.
2 SHEETS—SHEET 2.

Witnesses
Inventor

UNITED STATES PATENT OFFICE.

JOSHUA GREEN, OF LONDON, ENGLAND.

TALKING-MACHINE.

1,094,067.  Specification of Letters Patent.  Patented Apr. 21, 1914.

Application filed May 26, 1913. Serial No. 769,961.

*To all whom it may concern:*

Be it known that I, JOSHUA GREEN, a subject of the King of Great Britain, residing at 27 Pyrland road, Canonbury, London, England, have invented new and useful Improvements in Talking-Machines, of which the following is a specification.

My invention relates to improvements in talking machines or gramophones and has mainly for its object to provide a machine which, while possessing a horn of full, or approximately full dimensions, yet when not required for use can be packed into a small space, thus rendering the machine eminently suitable for many purposes, for example, for transport from place to place.

According to my invention I construct a gramophone or talking machine with a horn made in a number, preferably two, of parts, one of which is fixed within the casing of the machine and the other or others is or are adapted to telescope relatively thereto, so that when not required for use the said part or parts can be pushed partially or wholly within the fixed portion, but when required for use can be drawn out and turned into the position to receive the tone-arm.

My invention can advantageously be employed in combination with the known type of machine in which the horn is placed below the motor and in which the case of the machine is of cylindrical construction. With such a machine I combine a horn consisting of a fixed or stationary portion arranged within the said cylinder so that its larger or flared end is flush with one end thereof, and of a second movable elbow shaped portion which can telescope into the fixed part. This movable part, which slides within the fixed portion, is preferably also of a taper shape so that when the complete horn is extended, it is of the normal, or approximately the normal contour. The meeting ends of the two parts of the horn are preferably screw-threaded, or provided with any other suitable device, by means of which they can be locked in position when the movable elbow part is drawn out and turned to bring it into the proper position for receiving the tone arm, which, in the form of gramophone under consideration, is at the top of the cylinder body. The end of the casing which receives the moving elbow part of the horn is closed with a cover, which, however, is provided with a slotted portion at its lower part to receive the extremity of the horn when the latter is turned down and telescoped into the fixed horn part. It will thus be seen that when the machine is dismantled it occupies a space which practically corresponds with that of the casing. Furthermore, means may advantageously be provided in conjunction with the flared end of the horn whereby the said end may be adapted to receive a carrier or holder for records or the usual turn-table when the machine is not required for use. The holder or turn-table thus constitutes a cover to the open end of the horn which may serve as a receptacle for the tone-arm.

Figure 4:
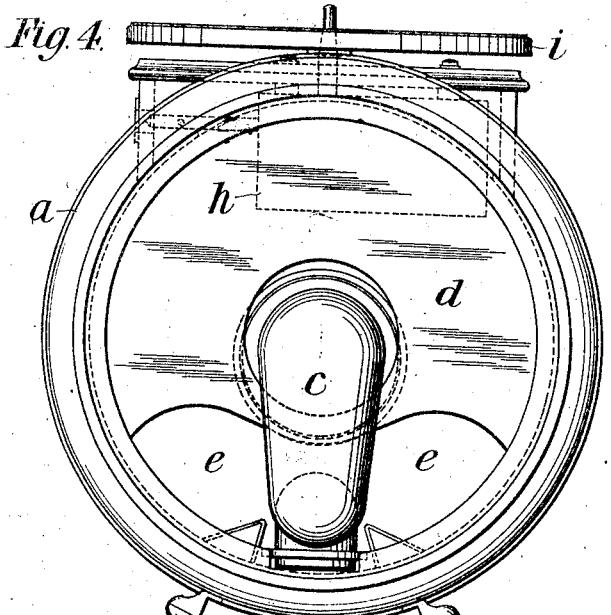

In the accompanying drawings:—Figure 1 is a sectional side view of one form of gramophone machine made according to the invention. Fig. 2 is a plan view thereof. Fig. 3 is a view similar to Fig. 1 but showing the horn in the collapsed position, and Fig. 4 is an end view showing the parts in the position illustrated in Fig. 3.

$a$ represents the casing which is here shown of cylindrical construction and is preferably made of ply-wood. $b$ is the fixed portion of the horn which is located within the said cylinder $a$ in such a position that the larger or flared end thereof is flush with one end of the cylindrical casing $a$ as will be clearly obvious on reference to Figs. 1 and 3.

$c$ is the movable elbow portion of the horn which slides within the fixed portion and is of a taper shape and the extremity of which is provided with an external screw-thread $c^1$, which is adapted to engage with an internal screw-thread $b^1$ upon the inner end of the fixed portion $b$ of the horn, these screw-threads enabling the two parts of the horn to be rigidly secured in the extended position hereinafter described.

$d$ is the cover which is fitted to the end of the casing which receives the moving elbow part $c$ of the horn and $e$ is the slot formed at the lower part of the cover for the reception of the said elbow part $c$.

$f$ is the tone-arm which is carried by the elbow $c$ and $g$ the sound-box fitted to the end of the tone-arm in the usual way.

$h$ is the motor which is of ordinary construction and is fitted within the casing $a$ in the space between the horn and the top of the casing $a$ and $i$ is the turn-table which is driven from the motor in the ordinary manner. With this arrangement it will be understood that when the gramophone is not required for use the tone-arm *f* is removed from the elbow portion *c* of the horn which is then turned so as to disengage the screw joint $b^1$, $c^1$ after which the said elbow *c* can be pushed into the stationary portion *b*, and through the slot *e* in the cover *d* of the casing so that it eventually assumes the position indicated in Figs. 3 and 4. When the machine is to be used the reverse operation is carried out, that is to say, the elbow portion *c* of the horn is withdrawn from the stationary part *b*, turned so as to engage the screw-thread $b^1$ and $c^1$ and brought into the proper position to receive the tone-arm *f*, this position of the parts being shown in Figs. 1 and 2.

When the machine is collapsed or packed as shown in Figs. 3 and 4 the larger or flared end of the horn can receive the tone-arm *f* and can be closed either by means of the turn-table *i* which can be placed over the same and held in position by suitable clips or by means of a record or disk carrier *j* shown in Fig. 3 with two records or disks *k* in position, and retained in place by means of the pivoted buttons or clips *l* the records being attached thereto by means of the clamping screw and nut *m* Fig. 3.

Claims.

1. A talking machine comprising a casing, a horn made of two or more telescopic parts, one part being fixed within the casing and the other part or parts being designed to telescope axially within the fixed part from the small end of said fixed part toward its large end and means whereby the telescoping parts can be locked in the extended position, substantially as described.

2. A talking machine or gramophone comprising a cylindrical casing having a horn made of two parts one of which is fixed within the casing and has its flared end flush with one end of the latter and the other or elbow portion of which is designed to telescope axially within the fixed portion from the small end of said fixed part toward its large end, the meeting ends of the said two parts being provided with a locking device.

3. A talking machine comprising a cylindrical casing having a horn made of two parts, one of which is fixed within the casing and has its flared end flush with one end of the casing and the other portion of which is designed to telescope axially within the fixed portion from the small end of said fixed part toward its flared end, the meeting ends of the said two parts being provided with a locking device, a turn-table mounted on the top of said casing, said turn-table being adapted to be placed over the front of the casing when the machine is not in use, and means for locking said turn-table to the front of the casing.

4. A talking machine comprising a casing, a horn provided in said casing and having its flared end flush with one end of said casing and its small end provided with one portion of a detachable locking connection, and an elbow horn section having a flared end provided with the other portion of the detachable locking connection adapted to engage the locking connection on the horn when the machine is in use, and be disengaged therefrom when not in use, the flared end of the elbow horn section being adapted to rest in the horn when the apparatus is not in use and its small end being adapted to rest between the horn and the casing.

5. A talking machine comprising a casing, a horn provided in said casing and having its flared end flush with one end of said casing, the horn being gradually tapered from the flared end to its small end thereby providing a space between the horn and the casing, an interior screw thread provided in the small end of said horn, and an elbow horn section having its flared end provided with an exterior screw thread adapted to engage said interior screw thread when the machine is in use, the flared end of the elbow horn section being adapted to rest in the horn and its small end adapted to rest in the space between the horn and the casing when the machine is not in use.

JOSHUA GREEN.

Witnesses:
JOHN E. BOUSFIELD,
C. G. REDFERN.